United States Patent [19]

Niksa et al.

[11] Patent Number: 4,950,561

[45] Date of Patent: Aug. 21, 1990

[54] METAL-AIR BATTERY WITH EASILY REMOVABLE ANODES

[75] Inventors: Andrew J. Niksa; Marilyn J. Nikasa, both of Concord; Jay M Noscal, Jefferson; Thomas J. Sovich, Mentor-on-the-lake, all of Ohio

[73] Assignee: Eltech Systems Corporation, Boca Raton, Fla.

[21] Appl. No.: 373,362

[22] Filed: Jun. 29, 1989

[51] Int. Cl.⁵ .............................................. H01M 8/02
[52] U.S. Cl. ........................................ 429/27; 429/28
[58] Field of Search .................................... 429/27, 28

[56] References Cited

U.S. PATENT DOCUMENTS

3,592,692  7/1971  Jerabek ................................... 429/28
3,592,693  7/1971  Rosansky ................................ 429/28

Primary Examiner—Donald L. Walton
Attorney, Agent, or Firm—John J. Freer

[57] ABSTRACT

The present inveniton resides in a metal-air battery consisting of one or more cells. Each cell comprises a cell frame. An air cathode is attached to each face of the frame. An anode blank is inserted through an access opening in the frame into the space between the cathodes. The anode blank comprises an elastomeric rubber labyrinth seal molded to the blank and sealing the access opening. Means may be provided for circulating electrolyte into an out of the spaces between the anode and air cathodes. A preferred electrolyte is an aqueous solution of an alkali hydroxide.

34 Claims, 6 Drawing Sheets

Fig.15 a # METAL-AIR BATTERY WITH EASILY REMOVABLE ANODES

BACKGROUND OF THE INVENTION

The present invention relates to a metal-air battery consisting of a cell frame and an air cathode attached onto each face of the frame. An anode is inserted into the space between the cathodes so that dissolution occurs on both sides of the anode.

DESCRIPTION OF THE PRIOR ART

Prior U.S. Pat. No. 3,513,030 discloses a cell comprising an envelope-shaped air cathode, a replaceable consumable anode positioned within the envelope of the cathode, and an electrolyte between the anode and cathode. Zinc is listed as a preferred anode material, but aluminum is also mentioned. The electrolyte can be an aqueous alkali hydroxide, or a "dry" alkali hydroxide in which water is added later. Other electrolytes are also disclosed. A battery, made up of a plurality of these cells, utilizes end plates and a drive screw mechanism pressing the cells together. The anodes are inserted into the envelope cathodes through openings at the top of the envelope cathodes. The openings and anodes have cooperating surfaces which bear against each other. However, aqueous alkali hydroxides are known wetting agents. Even if the opening and anode cooperating surfaces are machined to very close tolerances, the end plates and drive screw mechanism appear to be necessary to press the opening and anode cooperating surfaces together in an attempt to seal the openings. No seal which is effective without the use of a mechanism such as end plates and a drive screw and/or close tolerance machining is disclosed.

Prior U.S. Pat. No. 3,518,123 discloses a structure which is similar to that of U.S. Pat. No. 3,513,030. In U.S. Pat. No. 3,518,123, the cell includes a reservoir in communication with the electrolyte chamber arranged to replenish electrolyte or water lost by transpiration of water vapor through the hYdrophobic member of the cell cathode. In this patent, as with U.S. Pat. No. 3,513,030, no effective seal sealing the anode within the envelope cathode opening is disclosed.

Prior U.S. Pat. No. 3,960,600 discloses an envelope cathode. A removable anode fits within the envelope cathode. Wrappings around the anode retain an electrolyte. A handle on the anode facilitates removal of the anode. The anode is locked into position in the envelope cathode by negative terminals which fit into jacks on the side of the envelope cathode. An O-ring in the anode top seats the anode top within an opening in the envelope cathode. Through experience it has been determined that O-rings can require extremely fine tolerances and high sealing forces to be an effective sea in such applications against leakage of an aqueous alkali hydroxide.

U.S. Pat. No. 4,560,626 discloses a metal/air battery which comprises a housing having electrolyte inlets and outlets. The housing on the inside supports a plurality of anodes and Pairs of cathodes on opposite sides of each anode. Seals between the cathodes and housing walls direct the flow of electrolyte into the spaces between the anodes and cathodes. Means are provided for removing the anodes from the housing. There is no disclosure of a means for anode current collection, nor of openings in the housing into which the anodes are seated.

British Patent No. 1,223,127 discloses a plurality of cell frames. Air permeable cathode surfaces are affixed to opposite sides of the frames. A plate-like anode is inserted between the cathodes. A handle is provided on the anode for removing it. The anode has separator paper impregnated with electrolyte applied to opposite sides of the anode. The patent has no disclosure concerning a means for sealing the anode within the cathode frame.

SUMMARY OF THE INVENTION

The present invention resides in a metal-air battery consisting of one or more cells. Each cell comprises a cell frame. An air cathode is attached to each face of the frame. The frame has an access opening. An anode blank comprises a consumable end which is inserted through said access opening into the space between the cathodes. An exposed end on the anode blank protrudes from the access opening and can be grasped for replacement of the anode blank through said opening. The anode blank comprises a labyrinth seal which is molded directly onto the anode blank between said consumable end and said exposed end sealing said access opening.

Preferably, the labyrinth seal is an elastomeric rubber material which is vulcanized directly onto the anode blank. The seal has a cross-section in which a main body portion presses against the anode blank and a plurality of lobes press against the frame opening. The lobes can be tapered in a manner which not only resists removal of the anode blank from the access opening but also enhances the sealing characteristics of the labyrinth seal.

In a battery which comprises a plurality of cells, each cell anode exposed end preferably comprises a contact edge which is the anode electrical contact. Each cell comprises a cathode bus which is disposed to one side of the anode contact edge. The anode contact edges and cathode buses all lie in the same plane. A plurality of contact plates bridge the gap between the anode contact edge of one cell and the cathode bus of an adjacent cell, thus connecting the cells in-series.

An elongated inter-electrode buswork is removably attached to the battery. The contact plates are positioned in spaced-apart relationship longitudinally along the buswork. Alternatively, the contact plates are individual shaped jumper bars engaging the anode contact edge of one cell and the cathode bus of an adjacent cells. If desired, the cells can be connected in parallel.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

Figure 2:
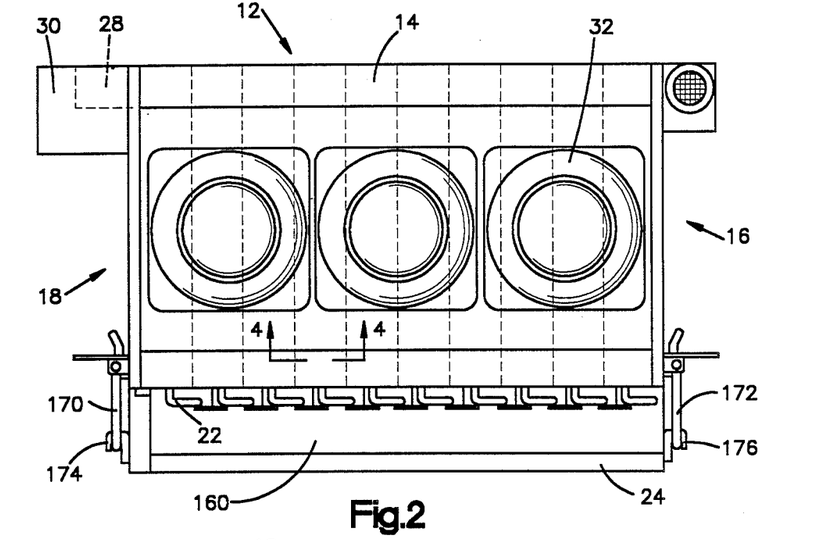
FIG. 2 is a plan view of a battery of the present invention.
Figure 3:
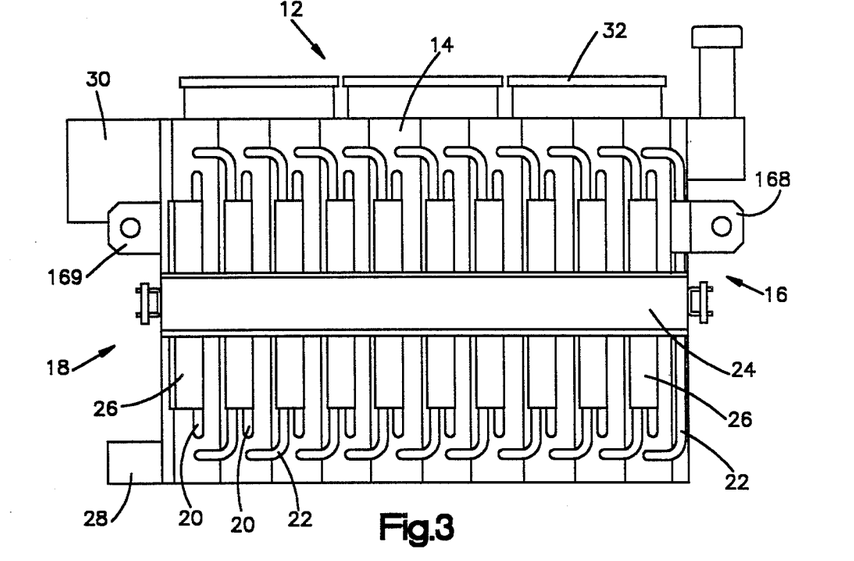
FIG. 3 is an elevation side view of the battery of FIG. 2.

FIGS. 2 and 3 illustrate a battery 12 of the present invention. The battery comprises a plurality of cells 14 in side-by-side relationship. The battery has a cathode end 16 and an anode end 18.

Figure 1:
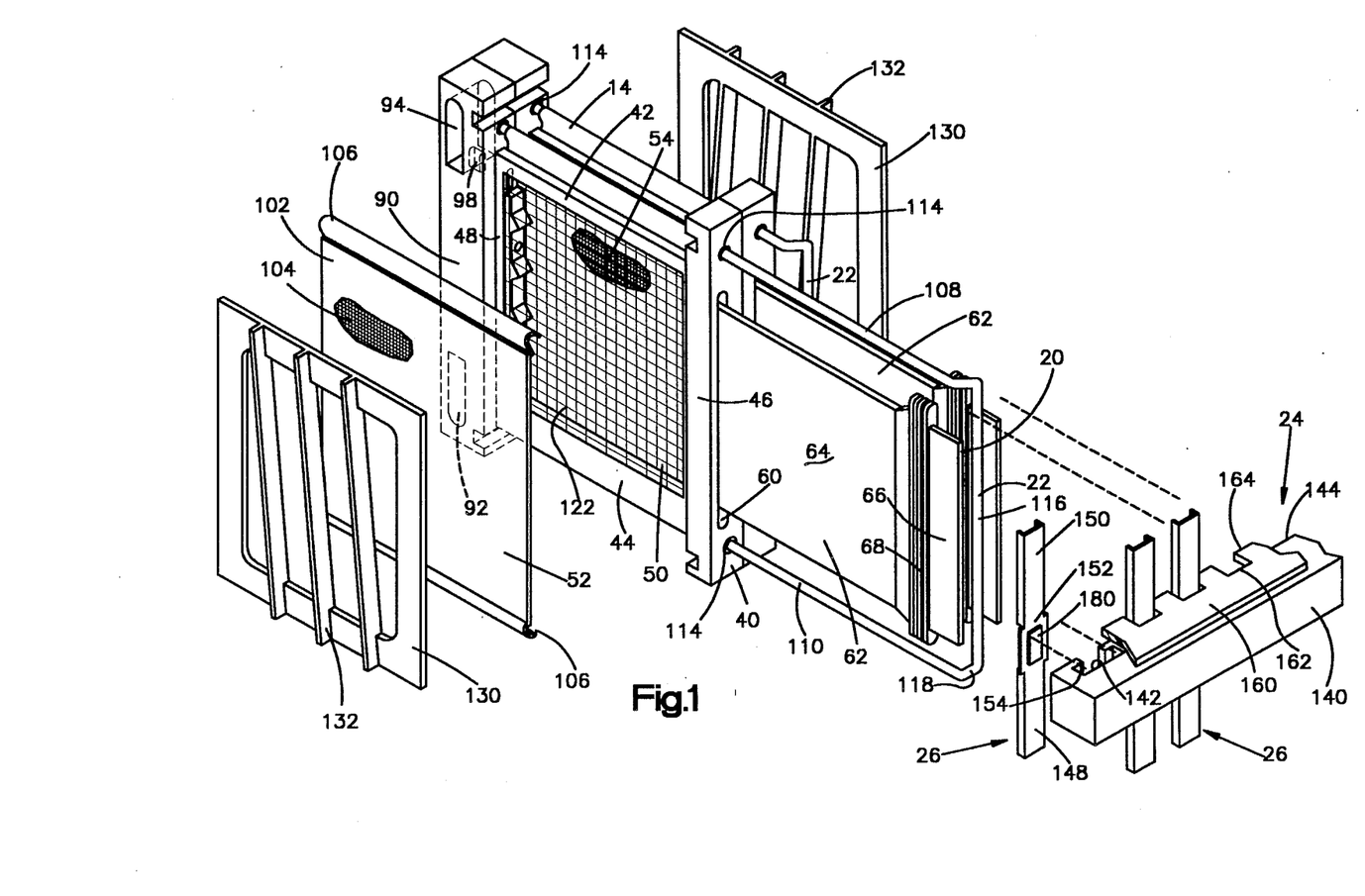
FIG. 1 is a partially exploded view of a pair of side-by-side cells of the battery of the Present invention.

In the embodiment shown in FIGS. 2 and 3, the battery has ten cells 14. Each cell comprises an anode contact edge 20 (FIG. 3) and a cathode bus 22 (FIGS. 2 and 3), which preferably has at least general "U-shaped" configuration as shown in FIG. 1. An external buswork 24, to be described in more detail further hereinbelow, comprises a plurality of interbus contact plates 26 (FIG. 3). The contact plates 26 electrically bridge the gap between the cathode bus 22 of one cell and the anode contact edge 20 of a adjacent cell, thus connecting the cells in-series.

The battery has an electrolyte inlet 28 and an electrolyte outlet 30 by which electrolyte is circulated into and out of the cells 14. Air fans 32 are provided for inducing the flow of air through inter-cell spaces, between adjacent cells 14, into the air cathodes, in a manner to be described. The use of air fans 32 is optional.

Details of the cells 14 are shown in FIGS. 1 and 4-6. In FIG. 1, for purposes of illustration, two cells in side-by-side relationship are shown.

Each cell 14 comprises a frame 40 somewhat in the shape of a window frame. The frame comprises top and bottom walls 42 and 44 and side walls 46 and 48. The frames 40 are made of a machinable or moldable plastic that is resistant to electrolyte such as acrylonitrile - butadiene - styrene (ABS) resins or chlorinated polyvinyl chloride (CPVC) resins and including polypropylene, although the use of other materials is contemplated. In practice, where the battery comprises a plurality of cells, as shown in FIGS. 2 and 3, the cells 14 are held together by welding or gluing the frame 40 of one cell 14 on its walls 42, 44, 46 and 48, to the frame walls 42, 44, 46 and 48 of adjacent cells 14. The top, bottom and side walls of the frame 40 define a rectangular-shaped electrolyte chamber 50. The frame is double-faced with air cathodes 52, 54 glued or otherwise fastened onto each face. The cathode 52 on the side of the frontmost cell in FIG. 1 is substantially fully visible. The air cathode 54 on the opposite face of the frontmost cell in FIG. 1 is partially visible through the electrolyte chamber 50.

Figure 4:
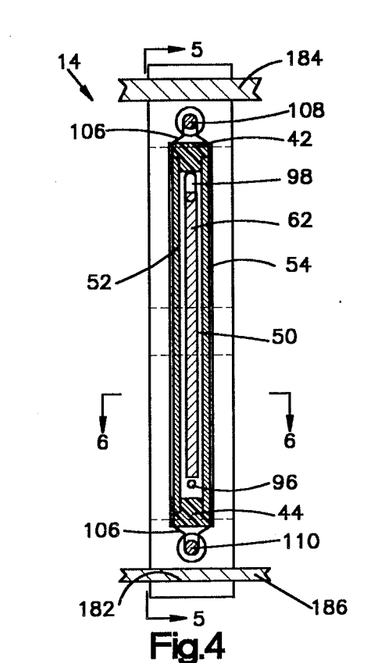
FIG. 4 is a section elevation view of a portion of an assembled cell taken along line 4—4 of FIG. 2.
Figure 5:
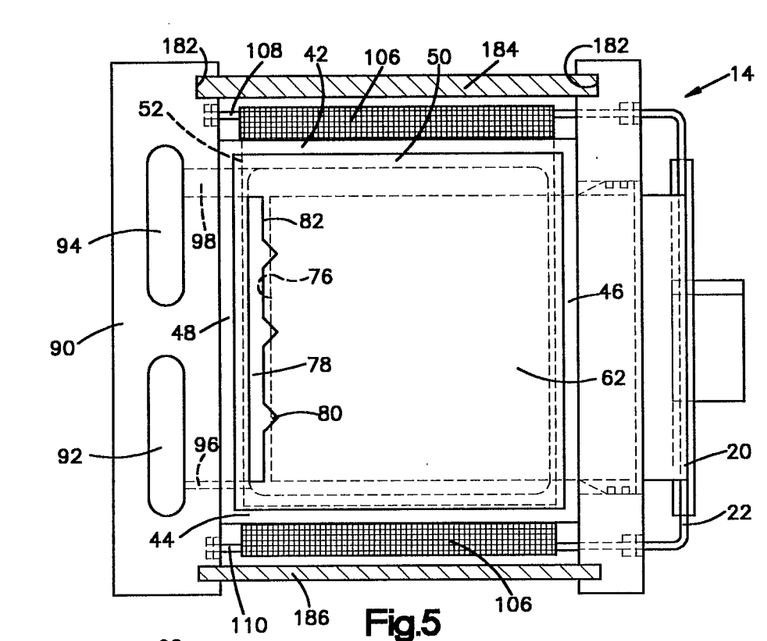
FIG. 5 is a section view taken along line 5—5 of FIG. 4.
Figure 6:
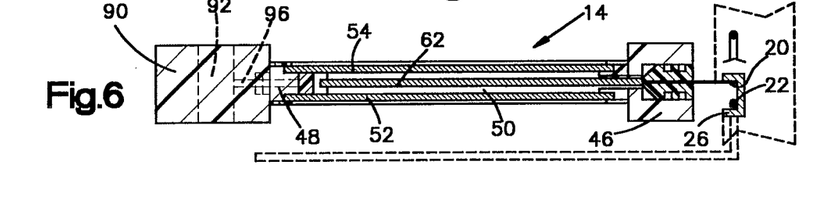
FIG. 6 is a section view taken along line 6—6 of FIG. 4.

In FIG. 1, which is a partially exploded view of two cells 14, the frontmost air cathode 52, as viewed in FIG. 1, is shown spaced from the frame 40. This is for the purpose of illustration. In actual practice, the cathode 52 is affixed to the frame walls 42, 44, 46 and 48 as shown in FIGS. 4, 5 and 6.

Each cell frame 40 has an elongated vertically extending frame opening 60 (FIG. 1) formed in side wall 46. The opening 60 is in communication with the electrolyte chamber 50. The opening is sized to receive a plate anode 62 plus a seal 68. The anode 62 is inserted through the opening 60 into the electrolyte chamber 50 so that it is between the air cathodes 52, 54. In FIG. 1, both of the plate anodes 62 are shown withdrawn from the electrolyte chambers 50 of the two cells 14, for the purpose of illustration.

Figure 10:
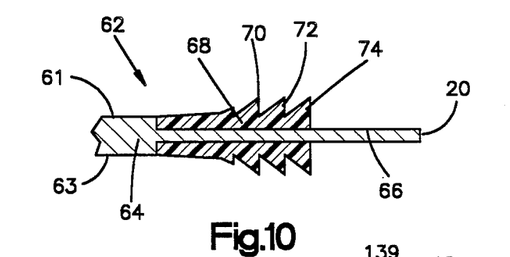
FIG. 10 is a partial section view of an anode and labyrinth seal molded to the anode taken along line 10—10 of FIG. 11.
Figures 11, 12:
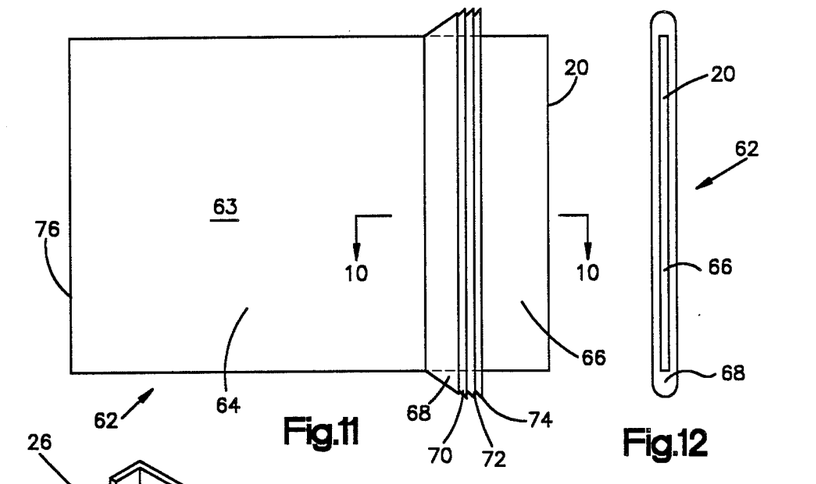
FIG. 11 is an elevational side view of an anode of the present invention.
FIG. 12 is a plan view of the anode of FIG. 11.

Details of the plate anode 62 are shown in FIGS. 10, 11 and 12. As shown in FIG. 11, the anode is essentially a rectangular plate with oppositely facing planar surfaces 61, 63. The plate anode has a consumable end 64 and a hand-grasping, or exposed, end 66. The dimensions of the anode plate are sufficient so that when the consumable end 64 is inserted within the electrolyte chamber 50, the hand grasping end 66 protrudes from the chamber and is exposed permitting the plate anode 62 to be withdrawn from the chamber 50.

As shown in FIG. 10, the hand grasping end 66 can be thinner in cross-section between the opposed planar surfaces 61, 63 than the consumable end 64. A seal 68 is interposed between the hand grasping end 66 and the consumable end 64.

In the embodiment illustrated, the hand grasping end 66 also functions, by means of edge 20, as the anode contact, in a manner to be hereinafter described. It is to be understood that the hand grasping end 66 may be tabbed or slotted or configured in other similar manner to assist manual insertion of the Plate anode 62 through the frame opening 60 and into tight contact therewith. To provide the greatest amount of the plate anode 62 for contact with electrolyte, the hand grasping end 66 supplies only from about 5 to about 30 percent of the length of the plate anode 62. Preferably, for best efficiency and economy overall for the battery, such hand grasping end supplies about 10-25 percent of the plate anode 62 length.

The anode 62 can be comprised of any metal conventionally employed in a metal-air battery. Examples of metals which have been used are aluminum, zinc, iron, beryllium, cadmium, magnesium, lithium and lead as well as alloys and intermixtures of the same. A preferred metal in the practice of the present invention is a high performance, aluminum alloy having low polarization and low parasitic corrosion values. Such alloys are known and are disclosed, by way of example, in U.S. Pat. No. 3,379,636, in U.S. Pat. No. 4,751,086, and in patents cited therein. It is possible, by suitably alloying the aluminum, to obtain very low corrosion current values, for instance, ten (10) milliamps per square centimeter. The disclosures of U.S. Pat. Nos. 3,379,636 and 4,751,086 are incorporated by reference herein.

Although it is contemplated that other electrolytes can be used, e.g., saline electrolyte, a preferred electrolyte for use in the present invention is an aqueous solution of an alkali hydroxide, such as sodium hydroxide, potassium hydroxide, or caustic mixtures containing the same. However, an aqueous solution of an alkali hydroxide has good surface wetting properties and is capable in many applications of leaking past imperfect seals.

The anode seal 68 is an important aspect of the present invention. It is dimensioned to fit within the frame opening 60 in the frame side wall 46 sealing the opening so as to prevent electrolyte from exiting the cell. This anode seal also protects the portion of the anode under the seal where the anode is at open circuit and therefore susceptible to corrosion. The anode seal 68 is of the labyrinth type having lobes, e.g., the three principle lobes 70, 72 and 74 (FIGS. 10 and 11) which press against opening 60. These lobes concentrate the sealing force and provide a tortuous path for hindering the flow of electrolyte past the anode seal 68 to the outside of the cell. The lobes 70, 72, and 74 have a resilient tapered cross section, as shown in FIG. 10. Thus, they concentrate the force of the lobe against the opening 60 on a small area at the apex of each lobe. This provides high sealing force without a large overall compressive force.

The taper from the apex of each lobe is accentuated in the direction inwardly toward the consumable end 64 of the plate anode. This functions to reduce the amount of force which is required to press the anode blank 62 into the frame opening 60. The taper also functions to resist anode removal and lock the anode in place when the anode/seal assembly is pressed down into the cell frame.

The seal 68 is preferably vulcanized directly onto the anode blank 62. This Provides an intimate seal between the anode surfaces 61 and 63 and the seal 68. Preferred elastomeric rubber materials are neoprene and ethylene-propylene-diene-monomer (EPDM), which are stable to caustic electrolytes. The seal preferably has a low hardness, for instance about 40 durometer.

When the plate anode 62 is inserted within the electrolYte chamber 50, it seats along its innermost edge 76 against an anode gasket 78 (FIG. 5). The anode gasket 78 fits inside of the electrolyte chamber 50 against side wall 48. The gasket 78 is provided with spaced lobes 80. The plate anode 62, in seating against the anode 78, presses against the lobes 80 which hold the anode plate edge 76 slightly spaced from the surface 82 of the gasket. The lobes 80 provide a high, localized force against the anode plate edge 76 and serve three functions: (i) they serve as a stop for the innermost edge 76 of the plate anode 62 centered between the air cathodes 52, 54; (ii) serve to seal the electrolyte within the electrolYte chamber 50; and (iii) to position the anode 62 so that the anode exposed contact edges 20 lie in essentially the same plane.

Referring to FIGS. 1 and 5, the cell frame side wall 48 comprises an enlarged section 90 which contains a lower electrolyte inlet manifold 92 and an upper electrolyte outlet manifold 94. The manifolds 92, 94 extend transversely through the section 90. Thus, the inlet manifold 92 of one cell connects with the inlet manifolds 92 of adjacent cells, i.e., cells on opposite sides of the cell shown in FIG. 5. Correspondingly, the outlet manifold 94 connects with the outlet manifolds 94 of the adjacent cells on the opposite side of the cell shown in FIG. 5. The inlet manifold 92 of the endmost cell at the anode end 18 of the battery (FIG. 3) connects with electrolyte inlet 28 (FIG. 3), and the outlet manifold 94 of the endmost cell at the anode end 18 of the battery connects with electrolyte outlet 30.

Each inlet manifold 92, of each cell, communicates with the cell chamber 50 through an electrolyte inlet orifice 96 (shown in FIGS. 4, 5 and 6). Each outlet manifold 94 of each cell communicates with the electrolyte chamber 50 through an outlet port 98. As shown in FIG. 5, the outlet port 98 is much larger in diameter than the inlet orifice 96. The purpose of the small diameter of the inlet orifice 96 is to reduce shunt currents within the cell. The larger diameter of the outlet port 98 establishes only a slight internal Pressure of electrolyte within each electrolyte chamber 50.

Each air cathode 52, 54 is fastened to the cell frame, such as by means of a caustic resistant epoxy cement or the like, e.g., a silicon adhesive. One suitable adhesive is an aluminum filled epoxy cement marketed by Devcon Corporation under the trademark "Devcon". The air cathodes 52, 54 can also be sealed to the frame 40 by means of a gasket. Suitable gasket materials are the same as those given for the anode seal 68, e.g., neoprene or EPDM. In general, it is contemplated that any air cathode which can be employed in an aluminum-air battery will be serviceable for use herein.

Details of a preferred high performance air cathode suitable for use in the present invention are disclosed in prior Pat. No. 4,756,980 assigned to the assignee of the present application. The disclosure of U.S. Pat. No. 4,756,980 is incorporated herein by reference. The air cathodes disclosed in U.S. Pat. No. 4,756,980 comprise a thin, single layer of catalyzed carbon particles, in admixture with 10–50 weight percent of a hydrophobic polymeric binder containing a fluorocarbon polymer. Either or both the front or back flat surface of the sheet has pressed into it a foraminous current-conductive metal mesh or screen. In the embodiment illustrated, in FIG. 1, the air cathode 52 is shown schematically as a sheet 102 of a layer of carbon particles in admixture with a hydrophobic binder and an outer foraminous metallic current collector screen 104 embedded in the carbon/binder layer. The metal screen is exposed to the sheet surface but is embedded in the surface. The metal screen is then sintered to the sheet at high temperature. Materials suitable for cathode screens are silver plated copper wire, preferably copper wire which is nickel plated with a silver plate top layer.

The sheet of catalyzed carbon Particles and hydrophobic polymeric binder has an open, porous construction receptive to the flow of air but at the same time one that is impermeable to the flow of aqueous electrolyte into the sheet pores. The metal screen gives the sheet mechanical strength and also functions as a metallic current collector. For imparting even more strength to the air cathode, the cathode can be "double gridded" as disclosed in U.S. Pat. No. 4,756,980, with metal screen on both sides.

Another especially suitable high performance air cathode is disclosed in U.S. Pat. No. 4,615,954, also assigned to the assignee of the present application. This air cathode comprises at least two bonded composite layers, one of which is a form-stable conductive wet proofing layer, while the other is a thin-active layer containing active carbon particles and having a high internal surface area, e.g., more than 1,000 meters$^2$/gram. The disclosure of this patent is also incorporated by reference herein.

In the embodiment illustrated in FIGS. 1 and 4, 5 and 6, the foraminous metal screen 104 has a height dimensioned so that it extends beyond the confines of the frame top and bottom walls 42, 44, in upper and lower contact tabs 106 (FIGS. 4 and 5). The cathode bus 22 is in the shape of a handlebar with legs 108, 110, which may be glued, with an epoxy glue or the like, or gasketed, into alignment holes 114 in the cell frame 40. In the embodiment shown in FIG. 1, the cathode bus 22 of the frontmost cell 14 is shown in a position substantially withdrawn from holes 114 of the cell frame 40, whereas the bus 22 of the rearmost second cell 14 is shown in a position inserted into the alignment holes 114 of the cell frame 40.

FIGS. 4 and 5 show connection of the cathode contact tabs 106 to the bus legs 10, 110. As shown in FIG. 4, the contact tabs are wraPPed around the bus legs 108, 110 and can be metallically fastened, e.g., brazed or soldered, or mechanically fastened, e.g., clipped, to the bus legs to provide good current contact.

As shown in FIG. 1, each cathode bus 22 comprises an intermediate, or "post", section 116 between legs 108, 110 which is offset, by bends 118, slightly to one side of the plane defined by the bus legs 108, 110. Thus the bus legs 108,110 and anode contact edge 20 of one cell can be at least substantiallY in the same plane, but the bus intermediate section 116 for that cell is offset from such plane. In the embodiment illustrated, the bus intermediate section 116 of the frontmost cell 44 is offset rearwardly so that the intermediate, or center, section 116 is parallel to and adjacent the anode contact edge 20 of the adjacent rearward cell. When all of the cathode buses of all the cells 14 are inserted fully within the alignment holes 114, all of the bus intermediate sections 116 lie in essentially the same plane, one which is parallel to the side of the battery. The anode contact edges 20 also lie essentially in this same plane. It is preferred that the cathode bus 22 be of a metal whose oxide is electronically conductive or plated with such a metal, e.g., tin plated copper or silver plated copper.

Figure 8:
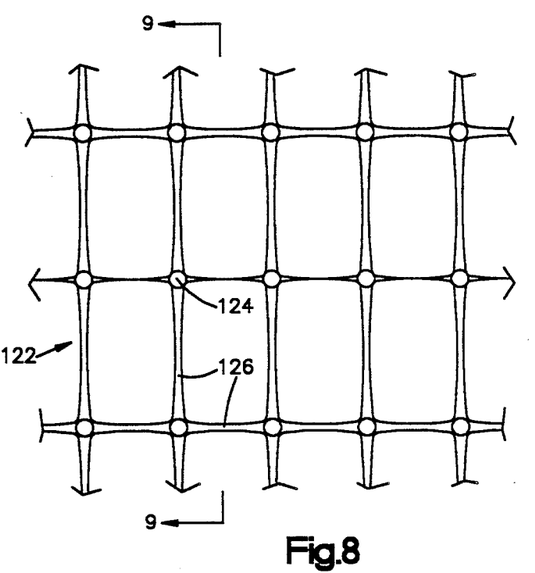
FIG. 8 is an elevation view of a cathode/anode separator for the battery cell of the present invention.
Figure 9:
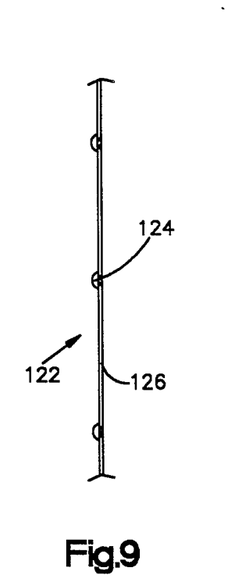
FIG. 9 is a section view taken along line 9—9 of FIG. 8.

Each cell 14 comprises a pair of separators 122, shown in detail in FIGS. 8 and 9, between the cell plate anode 62 and the cell air cathodes 52, 54. The purpose of the separators 122 is to maintain a gap between the plate anode 62 and the air cathodes 52, 54. The separators 122 have an open mesh construction and are of a flexible plastic material, such as polypropylene, resistant to electrolyte. The mesh construction comprises a plurality of thin spaced-apart horizontal and vertical strands 126 with thickened nodules 124 at the intersections of the strands. The nodules maintain the desired anode/cathode gap separation, whereas the strands, having a nominal thickness much less than the thickness of the nodules, permit the flow of electrolyte in the areas between the cell anode 62 and air cathodes 52, 54.

Referring back to FIG. 1, each air cathode 52, 54 comprises a cathode support frame 130, made of the same material as frame 40. The support frame can be glued onto the air side of the cathode 52, 54 around the perimeter of the cell frame 40 using a caustic resistant epoxy cement or fastened by similar means. The support frame 130 is provided with ribs 132 which prevent bowing of the air cathode during hydraulic upset and also give mechanical support to the cathode glue joints by eliminating shear force generation.

As shown in FIG. 1, the ribs 132, for the air cathode frame 130 facing outwardly are angled slightly with respect to the sides of the frame 130. The ribs 132 of the cathode support frame 130 facing rearwardly, as viewed in FIG. 1, are differently angled. In general, as shown in the figure, such different angles can be at least substantially equal but opposite. Thus, the ribs 132 of one cathode support frame 130 engage but do not mesh with those of the cathode support frame 130 of the facing cathode of an adjacent cell. In this way, inter- spacing between the air cathodes of adjacent cells is maintained for adequate flow of air into the air cathodes.

Preferably, the cell operates at a low internal electrolyte pressure. This requires very low external air pressure to balance the internal electrolyte pressure. Thus, the cells can be run at, or slightly above, ambient air pressure. A slight pressure above ambient air pressure presses the cathode towards the anode due to the differential pressure in favor of the air side. This maintains the desired anode/cathode gap and allows practical operation at low air pumping/compression costs.

Figure 14:
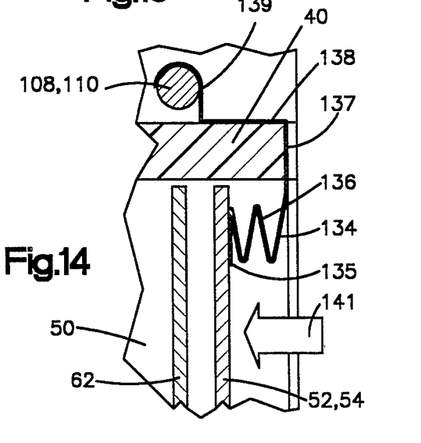
FIG. 14 is an enlarged partial section view of the cell of FIG. 4 showing a cathode bellows in accordance with the present invention.

It may be desirable to dimension the component parts so that a very thick plate anode 62, for instance about 0.5 inch, is disposed within the cell electrolyte chambers 50. In such instance, the cathodes 52, 54 can be made movable so that they move towards the anode 62 to maintain anode/cathode gap as the anode dissolves. An example of a suitable mechanism for doing this is a metal bellows 134 such as shown in FIG. 14. The metal bellows 134 is in the shape of a window frame with a flat inner surface 135 which is secured to the air cathode 52, 54. The flat surface 135 extends around the entire periphery of the air cathode 52, 54 and is sealed to the air cathode 52, 54, as by extending over the top of the air cathode 52, 54 and crimping, or bY means such as soldering or brazing. The bellows 134 has an accordion shaped section 136 connected to surface 135. The section 136 also extends around the entire periphery of the air cathode 52, 54, having the same configuration for the entire periphery as shown in FIG. 14. A tab 137 extends outwardly (relative to the cathode 52, 54) from the accordion section 136. The tab 137 extends completely around the peripherY of the cathode 52, 54 and is sealed for the entire periphery in area 138 to the cell frame 40, also using a caustic resistant epoxy cement or similar means. In this way, the metal bellows 134 seals the electrolyte chamber 50 against leakage of electrolyte from the chamber 50 in the area of the air cathodes 52, 54.

The metal bellows 134 is preferably made of a metal foil, the bellows folds in section 136 and other folds in the bellows being formed by crimping or other similar forming means. In the embodiment of FIG. 14, the flat inner metal surface 135 is electrically connected, for instance by brazing or soldering, to the current collector screen of the air cathode 52, 54 around the entire periphery of the cathode 52, 54. This may be in addition to being sealed to the air cathode 52, 54, as where crimping over the cathode is used. The outwardly extending tab 137, at the opposed upper and lower ends of the metal bellows 134, has formed extensions 139 which extend around the cathode bus legs 108, 110. The extensions 139 are electrically connected to the cathode bus legs 108, 110 in a way effective for the flow of electrical current, for instance by brazing, soldering, or clipping. In this way, current collected on the cathode collector screens is transmitted via the metal bellows 134 to the cathode bus legs 108, 110. An exemplary metal for the inner metal surface 135, bellows 134, tab 137 and any extensions, e.g., the extension 139, is a silver or nickel foil.

In operation, the metal bellows 134 is expandable and functions to allow a range of cathode movement as well as Provide electrical contact between the air cathode 52, 54 and bus 108, 110. As the anode 62 is consumed, a positive air pressure indicated by arrow 141 moves the air cathode 52, 54 in the direction of anode 62. Spacing between the anode 62 and cathode 52, 54 is maintained by the spacers of FIGS. 8 and 9 (not shown in FIG. 14).

Figure 13:
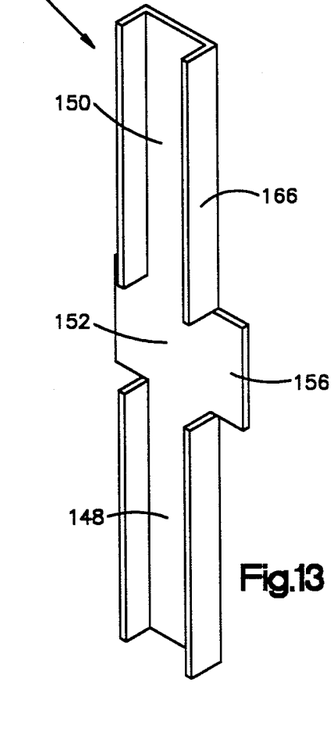
FIG. 13 is an enlarged perspective view of an interbus contact plate of the present invention.
Figure 15:
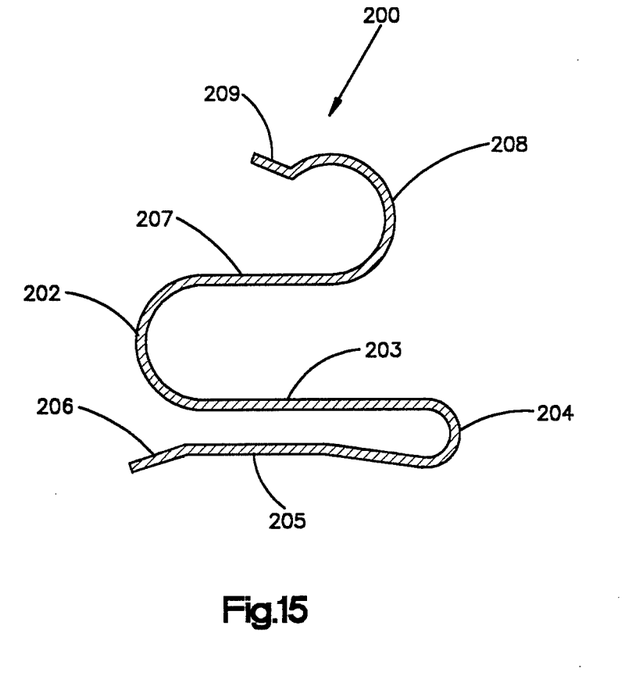
FIG. 15 is an end view of an intercell connector useful in the alternative to the interbus contact plate of FIG. 13.

Details of the inter-electrode buswork 24 are disclosed in FIGS. 1, 13 and 15. The inter-electrode buswork disclosed connects the battery cells in series. It is understood that the battery cells can also be connected in parallel if desired, as discussed in more detail hereinbelow.

The inter-electrode buswork 24 comprises an elongated terminal block 140 (FIG. 1). The terminal block 140 is made of a dielectric material such as ABS. The terminal block has a plurality of slots 142 which are spaced along a face 144 of the terminal block. For a battery with ten cells, there are ten slots 142.

Each slot 142 receives an electrically conductive, e.g., copper, interbus contact plate 26 (FIG. 13) or intercell bus connector 200 (FIG. 15). For purposes of convenience, reference will generally be made hereinafter only to the interbus contact plate 26 for securing in the buswork 24. But it is to be understood that the buswork 24 can be made to accommodate the intercell bus connectors 200 in place of the contact plates 26. Because of this interchangeability between the plates 26 and connectors 200, where the use of the term "contact plate(s)" is used, generally hereinafter (and not, for example, to refer to the specific design of the plate) it is to be understood to also mean "intercell bus connector." In FIG. 1, the frontmost contact plate 26 is shown in an exploded position removed from slot 142, to show details of the plate 26 and slot 142. Each interbus contact plate 26 is an elongated metallic current-conducting member having upper and lower contact portions 148, 150 and a center portion 152, as shown in FIGS. 1 and 13. The interbus contact plates 26 are positioned in the slots 142 so that they are oriented at right angles to the longitudinal axis of the terminal block 140. Each slot 142 is provided with lips 154 which partially close the slot openings. The center portion 152 of each contact plate 26 comprises outwardly extending flaps 156 (FIG. 13). The lips 154 (FIG. 1) engage the flaps 156 (FIG. 13) and serve to prevent removal of the contact plates 26 through the openings of slots 142.

The terminal block 140 has upper and lower retainer plates 160 secured thereto. Only the upper retainer plate 160 is visible in FIG. 1. The retainer plates are made of a dielectric material such as ABS and have slots 162 formed along one edge 164 thereof. The slots 162 correspond with slots 142 of the terminal block, except that the slots 162 are sized to accommodate only the narrower upper and lower portions 148, 150 of the interbus contact plates 26. In this way, the retainer plates 160 engages flaps 156 and function to keep the interbus contact plates 26 from sliding endwise from the terminal block slots 142.

Each interbus contact plate 26 is U-shaped in cross section, in upper and lower portions 148, 150, with flanges 166 (FIG. 13). The width dimension of the portions 148, 150 is such that when the inter-electrode buswork 24 is placed up against the side of the battery, shown in FIGS. 3 and 6, each interbus contact plate 26 bridges the gap between the anode contact edge 20 of one cell and the cathode bus 22 of an adjacent cell, at its intermediate section 116, making contact with each component. In FIG. 6, this cathode bus 22 of the adjacent cell is shown substantially in phantom, as is the intercell buswork. By such contact plate 26, contact edge 20 and cathode bus 22 connection, current is conveyed in series through the battery.

In FIG. 15, there is depicted in cross-section, an elongated intercell bus connector 200 that is of the spring clip type. The bus connector has a generally "U-shaped" center section 202 having first and second legs 203, 207. The first leg 203 not only forms a portion of the central U-shaped section, but also extends through a bend 204 and an opposite leg 205 to form a hairpin section. The opposite leg 205 terminates in an opening flange member 206. The U-shaped center section 202 from the second leg 207, extends into an open curved portion 208 which extends into and terminates at a flange member 209. In use, the U-shaped center section second leg 207, curved section 208 and opposite leg 203, will clamp onto the intermediate section 116 of a cathode bus 22. Then the hairpin portion of the intercell bus connector 200 slips onto the edge 20 of a plate anode 62. The design of this intercell bus connector provides, principally through the center U-shaped section 202 flexural tolerance, together with strength. The U-shaped section can serve as a lever arm for providing the tolerance needed to facilitate ease of applying the connector for connecting anode and cathode. The intercell bus connector 200 will be a metallic connector such as of standard spring copper or of copper beryllium alloy.

Parts of the circuitry of the battery 12 comprise the battery cathode terminal 168 (FIG. 3) and the battery anode terminal 169 (FIG. 3), which can each be of tin plated copper. As shown in FIG. 3, the cathode terminal 168 is fastened, for instance by soldering or brazing, to the cathode bus 22 of the endmost cell 14 at the cathode end 16 of the battery. The anode terminal 169 is connected into the battery circuit by means of an interbus contact plate 26 in electrical contact with an anode contact edge 20 of an endmost cell 14 at the anode end 18 of the battery.

If desired, the cells can also be connected in a monopolar (in parallel) arrangement. This can be done by modifying the inter-electrode buswork 24 terminal block 140 to jumper the anodes together and separately jumper the cathodes together. This obviates the need for the interbus contact plates 26. It is however contemplated to connect each cell stack in series and to then connect several stacks together in parallel, if parallel arrangement is desired.

As shown in FIG. 2, the battery has clamps 170, 172 at opposite ends. These clamps engage hooks 174, 176 at opposite ends of the inter-electrode buswork 24 and serve to hold the buswork 24 against the side of the battery. Thus, the cells of the present invention can be connected in-series by a very simple connect. Removing the inter-electrode buswork 24 is accomplished by a very simple disconnect; simply disengaging the clamps 170, 172 from hooks 174, 176. The clamps 170,172 and hooks 174,176 can be made of any economical and rugged metal, e.g., nickel or steel.

Removal of the inter-electrode buswork 24 provides ready access to the anode hand grasping ends 66, permitting simple removal and replacement of the anodes in the cells 14.

In the embodiment shown in FIG. 1, a compressible rubber gasket 180, e.g, of EPDM, is inserted between each interbus contact plate 26 and terminal block 140. The rubber gasket 180 functions to provide a compressive force of the interbus contact plate against the anode contact edge 20 and cathode bus 22 for good electrical contact, and provides tolerance relief from bus-to-bus.

Instead of using an inter-electrode buswork as shown in FIGS. 1 and 13, it may be desired to connect the multiple cells 14 by means of individual clips or jumper bars. These jumper bars have a "U"-shaped configuration, similar to the end configurations of contact plates 26, so as to bridge the gap between the anode contact edge 20 of one cell and the cathode bus 22 of an adjacent cell. Alternatively, the individual jumper bars may have a modified "W"-shaped configuration in which the two slots in each jumper bar are formed to expand and snap onto the anode contact edge 20 of one cell and onto the cathode bus 22 of an adjacent cell. This provides better contact and a more secure engagement of each jumper bar with the anode contact edges 20 and cathode buses 22.

Each cell frame 40 comprises an inwardly oriented slot 182 (FIG. 5) at each of the four corners of the frame 40. The four slots 182 are formed to extend laterally in the frame so that the slots 182 of one cell are aligned with those of the adjacent cells. In this way, the battery of the present invention can be Provided with upper and lower plates 184, 186 (FIGS. 4 and 5), made of ABS or the like, which define an air chamber embracing the cells. Air is fed into a common entrance manifold (not shown) and allowed to freely escape through a common discharge port (not shown). This air chamber containment is used such as when it is desirable to pressurize the air side, or when the the cell is run on oxygen or air scrubbed to remove carbon dioxide, or when the chamber is pressurized to move the cathodes 52, 54 toward the anode when the cathodes 52, 54 are mounted on a metal bellows.

Alternatively, the battery of the present invention can be run without air containment, that is without a physical air chamber, in which case, air movement on the air side of the cathodes can be fan assisted by fans 32. The fans 32 can be mounted on the upper plate 184, which would be suitably apertured to accommodate the air flow, or otherwise mounted above the cells. It is to be understood that it is contemplated that the battery will be run with any of the substituents which can be employed for a battery of this type, for example air or oxygen, and including such as have been scrubbed of carbon dioxide.

Figure 7:
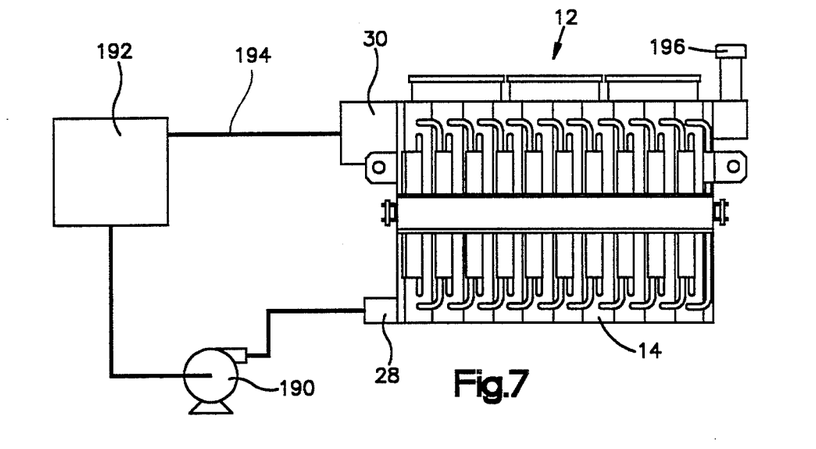
FIG. 7 is an elevation side view of the battery of FIG. 2 showing the electrolyte circulation system for the battery.

As shown in FIG. 7, circulation of electrolyte through the battery 12 can be accomplished by means of a pump 190 forcing electrolyte from a reservoir 192 into the battery through an electrolyte inlet 28. A heat exchanger (not shown) may be placed in this circulation system, e.g., between the reservoir 192 and the pump 190. Electrolyte is exhausted from the battery 12 through an electrolyte outlet 30 back to the reservoir 192 by means of an electrolyte outlet line 194.

In the embodiment illustrated in FIG. 7, exhaust connection 196 functions to exhaust hydrogen generated in the cells 14. This connection 196 connects with the electrolyte outlet manifold 94 (FIG. 5) of the cell 14 which is at the cathode end of the battery. The manifold 94 (FIG. 5) is sized to accommodate not only electrolyte flow, but also hydrogen gas flow. Alternatively, the hydrogen gas generated in the cells 14 can be exhausted through the electrolyte outlet line 194 (FIG. 7) into the battery reservoir 192. Particularly when an exhaust connection 196 is utilized, it is advantageous to orient the cell stack in the manner as shown in FIG. 7. However, it is understood that differing orientations may be useful and are contemplated.

The following example shows a way in which the invention has been practiced, but should not be construed as limiting the invention.

EXAMPLE

In this example, ten cells (14) were assembled into a battery stack and were connected to form an aluminum-air battery as shown in FIG. 1, including anodes with labyrinth seals as depicted in FIGS. 10-11 and a glued cathode-to-frame attachment means plus air chamber containment, both as depicted in FIG. 5. The inter-cell gap was 0.080 inch and was established by separators shown in FIG. 8. The overall size of the battery was about 11"×7"×7". A cathode of the type disclosed in the U.S. Pat. No. 4,756,980 was used. The length of the aluminum anode used measured, in inches, 4½", for the consumable end and 1" for the hand-grasping end. The initial electrolyte was a 7.5 molar aqueous Potassium hydroxide solution which was circulated in the manner shown in FIG. 7. Battery operating temperature was maintained at approximately 60° C.

The cathode was depolarized with pure oxygen at essentially atmospheric pressure. The electrolyte pressure was also at essentially atmospheric and the differential pressure across the air cathode was virtuallY zero. The performance profile is summarized in the table below:

TABLE

| Hours on Line | Amps | Voltage |
|---|---|---|
| 0 | 34.9 | 13.83 |
| 1.3 | 34.9 | 15.10 |
| 2.25 | 34.9 | 14.8 |
| 2.88 | 34.9 | 14.6 |
| 3.5 | 34.9 | 13.62 |
| 4.63 | 34.9 | 12.0 |

The battery ran for the full 4.63 hours, after which the test was terminated.

From the above description of a preferred embodiment of the invention, those skilled in the art will perceive improvements, changes and modifications. Such improvements, changes and modifications within the skill of the art are intended to be covered by the appended claims.

We claim:
1. A metal-air battery comprising:
   one or more cells; each cell comprising;
      a frame having opposed faces; an air cathode sealed to each face of said frame;
      an access opening in said frame;
      an anode blank comprising a consumable end inserted through said access opening into the space between said air cathodes and an exposed end protruding from said opening for replacement of the anode blank through said opening; and
      a labyrinth seal molded directly onto the anode blank between said consumable end and said exposed end sealing said access opening.
2. The metal-air battery of claim 1, wherein said seal is an elastomeric rubber material which is vulcanized directly onto the anode blank.
3. The metal-air battery of claim 2, wherein said seal has a cross-section comprising a main body portion extending circumferentially around the anode blank pressing against the anode blank and a plurality of circumferentially extending tapered lobes emanating from the exposed surface of said body portion, said lobes having an apex pressing against said frame opening, said lobes being tapered in a direction which reduces the amount of force required to press the anode blank into the frame opening.

4. The metal-air battery of claim 3, in which said taper resists withdrawal of the anode blank through said frame opening.

5. The metal-air battery of claim 1, wherein said anode blank is selected from the group consisting of zinc, iron, beryllium, cadmium, magnesium, lithium, lead and aluminum, and said battery contains an electrolyte which is a saline electrolyte or an aqueous solution of an alkali hydroxide.

6. The metal-air battery of claim 1, comprising means for circulating said electrolyte through said cells.

7. The metal-air battery of claim 1 comprising:
a plurality of cells;
each cell anode blank exposed end defining an anode contact edge;
a cathode bus having at least a section disposed to one side of said anode contact edge; and
means connecting said air cathodes to said cathode bus;
the anode contact edges and cathode bus sections of said cells all lying at least substantially in the same plane.

8. The metal-air battery of claim 7 comprising an elongated inter-electrode buswork removably attached to said battery;
a plurality of spaced-apart contact plates positioned longitudinally along said buswork;
each contact plate being positioned so that it bridges the gap between the anode contact edge of one cell and the cathode bus section of an adjacent cell electrically connecting the anode contact edge of one cell with the cathode bus section of an adjacent cell thus connecting the cells in series.

9. A metal-air battery of claim 1 comprising:
a plurality of cells;
means affixing said cell frames together;
means defining inter-cell spaces for access of air to said air cathodes;
a cathode frame for each air cathode positioned on the air side of each air cathode; and
reinforcing ribs in said cathode frame extending across the face of each air cathode.

10. A metal-air battery comprising:
a plurality of adjacent aligned cells;
a cathode bus for each cell, each cathode bus having at least a section which is aligned in the same plane with all such bus sections for each cell;
an anode blank; and
means replaceably positioning said anode blanks within said cell electrolyte chambers so that the anode blanks comprise ends protruding from said chambers an equal amount, the anode ends comprising contact edges in the same plane with said cathode bus sections.

11. The battery of claim 10 further comprising an inter-electrode buswork comprising an elongated terminal block assembly and a plurality of contact plates positioned on said assembly to electrically connect the anode contact edge of one cell with the cathode bus section of an adjacent cell.

12. The battery of claim 11, wherein said cathode buses have a handlebar configuration comprising a center section in the same plane with the anode contact edges and leg sections extending from said center section, the leg sections embracing opposite sides of cell frames having opposed faces with air cathodes sealed to said faces, said air cathodes comprising tab portions electrically connecting the air cathodes with said leg sections.

13. The battery of claim 12, wherein said air cathodes comprise a current collector surface, said tab portions being metallic current-carrying extensions of said air cathode current collector surfaces.

14. In a metal-air battery comprising a plurality of adjacent cells, each cell comprising a frame having opposed faces, air cathodes sealed to said faces, said frame and air cathodes defining an electrolyte chamber, and an anode blank replaceably positioned within said electrolyte chamber, the improvement comprising:
an opening in said frame to receive said anode blank;
a labyrinth seal of elastomeric rubber material vulcanized to said anode blank, said seal comprising a plurality of tapered lobes pressing against the frame opening sealing said opening;
means for circulating electrolyte into and out of said chamber.

15. The metal-air battery of claim 14, wherein said labyrinth seal has a cross-section defining a body portion engaging the anode surface, said plurality of lobes protruding from said body portion and being tapered with the apex of each lobe pressing against said frame opening.

16. The metal-air battery of claim 15, wherein the taper of each lobe is more pronounced in the direction of insertion of an anode into an electrolyte chamber than in the direction of withdrawal to reduce the amount of force required to press the anode blank into the frame opening.

17. In a cell adapted for use in a metal-air battery, said cell containing a frame and an air cathode with said frame and air cathode defining an electrolyte chamber for an anode blank to be positioned within said electrolyte chamber, the improvement comprising:
an elastomeric rubber gasket positioned within said electrolyte chamber for contact with an edge of said anode blank, said gasket comprising a plurality of lobes pressing against said anode edge for providing secure seating of said anode blank with said electrolyte chamber.

18. In a metal-air battery comprising a plurality of adjacent cells, each cell containing a frame and an air cathode, with said frame and air cathode defining an electrolyte chamber, and an anode blank positioned within said electrolyte chamber, the improvement comprising:
an anode blank exposed end protruding from said electrolyte chamber and terminating in an anode contact edge;
a cathode bus for each cell, said cathode bus having an at least generally U-shaped configuration with a center section and legs at opposite ends of said center section; and an inter-electrode buswork, said buswork comprising an elongated terminal block assembly and a plurality of contact plates spaced longitudinally along said terminal block assembly, said contact plates being positioned on said assembly to electrically connect the anode contact edge of one cell with the cathode bus center section of an adjacent cell.

19. A metal-air battery comprising:
one or more cells, each cell comprising;
a rectangular frame having opposed faces;

a rectangular air cathode sealed to each face of said frame;
said frame and air cathodes defining an electrolyte chamber;
an access opening in said frame;
a rectangular anode blank comprising a consumable end inserted through said access opening into the space between said air cathodes and an exposed end protruding from said opening for replacement of the anode blank through said opening;
a seal sealing said opening;
said anode blank exposed end defining an anode contact edge;
a cathode bus having a U-shaped configuration comprising a center section and spaced apart bus legs in a plane at right angles to said center section, said legs embracing opposite sides of said frame, the cathode bus comprising bends between said legs and center section whereby said center section is displaced from the plane of said legs; and
means electrically connecting said air cathodes to said cathode bus legs.

20. The battery of claim 19, wherein said seal is an elastomeric rubber labyrinth seal molded onto said anode blank sealing said frame opening.

21. The battery of claim 19, wherein said cathode bus legs are in essentially the same plane with the anode contact edge, said cathode bus center section being parallel with but displaced to one side of the anode contact edge.

22. The battery of claim 19, wherein said air cathodes comprise current collector surfaces and said means connecting said air cathodes to said cathode bus legs comprise tab portions which are metallic current collecting extensions of said air cathode current collector surfaces.

23. A metal-air battery comprising:
a plurality of adjacent aligned cells;
each cell comprising a frame having opposed faces;
air cathodes sealed to said faces;
said frame and air cathodes defining an electrolyte chamber;
a cathode bus for each cell, said cathode bus having a U-shaped configuration with a center section and legs at opposite ends of said center section embracing sides of said frame;
said center sections lying in the same plane;
each air cathode comprising a current collecting screen;
means electrically connecting said current collecting screens with said cathode bus legs;
an anode blank; and
means removably positioning said anode blanks within said cell electrolyte chambers so that the anode blanks comprise ends protruding from said chambers an equal amount, the anode ends comprising contact edges in the same plane with said cathode bus center sections;
the cathode bus center sections being offset to one side of the anode contact edges.

24. The battery of claim 23 comprising an inter-electrode buswork, said buswork comprising an elongated terminal block assembly and a plurality of contact plates spaced longitudinally along said terminal block assembly, said contact plates being positioned on said assembly to electrically connect the anode contact edge of one cell with the cathode bus center section of an adjacent cell.

25. In a cell adapted for use in a metal-air battery, said cell containing a frame and an air cathode, with said frame and air cathode defining an electrolyte chamber for an anode blank to be positioned within said electrolyte chamber, the improvement comprising:
means attaching said air cathode to said frame, said attachment means comprising a first surface attached to said frame around the periphery thereof, a second surface attached to said air cathode around the periphery thereof, and an annular expandable section intermediate said first and second surfaces in the shape of a bellows, said attachment means allowing the movement of said air cathode in the direction of said anode.

26. The battery of claim 25, wherein said cell contains a separator between the anode and air cathode.

27. The battery of claim 26, wherein said separator comprises an open mesh screen resistant to electrolyte having nodules at the intersections of the mesh strands which have a diameter greater than the diameter of the mesh strands.

28. The battery of claim 25, further comprising a cathode bus, wherein said attachment means is a metal foil, said second surface being electrically connected with an air cathode current collector screen, said first surface being electrically connected to said cathode bus.

29. The battery of claim 28, wherein said first surface is attached to said frame in sealing relationship therewith and said second surface is attached to said air cathode in sealing relationship therewith.

30. An anode blank for a metal-air battery, said anode blank comprising a consumable end and an exposed end, said exposed end being adapted for protruding from an opening in a cell of said battery upon insertion of said anode blank in said cell, said anode blank having a seal molded directly onto said blank intermediate said consumable end and said exposed end, with said seal comprising a main body portion extending circumferentially around the anode blank pressing against said anode blank.

31. The anode blank of claim 30, wherein said anode seal is a labyrinth seal and said main body portion has a plurality of circumferentially extending tapered lobes emanating from said main body portion, with said lobes being tapered toward said consumable end.

32. The anode blank of claim 30, wherein said exposed end comprises about 5 to 30 percent of the length of said anode blank.

33. The anode blank of claim 30, wherein said labyrinth seal is an elastomeric rubber seal vulcanized directly onto said anode blank.

34. In a metal-air battery comprising a plurality of adjacent cells each having an electrolyte chamber with an anode blank having an exposed end protruding from said electrolyte chamber and terminating in an anode contact edge, with each cell containing a cathode bus having a post section at least substantially adjacent said anode contact edge, and with there being an intercell bus connector between a cathode bus post section for at least one cell and an anode contact edge of an adjacent cell, the improvement comprising:
an elongated intercell spring clip bus connector having in cross-section, an at least substantially U-shaped center section of a curved portion with two extending side legs, with one side leg of said U-shaped center section forming a side leg from an adjacent, at least substantially hairpin shaped side section of said bus connector, and with the other side leg of said U-shaped center section extending curvilinearly to provide a curved side section of non-hairpin shape for said spring clip.

* * * * *